US012600396B2

(12) United States Patent
    Zhu

(10) Patent No.: US 12,600,396 B2
(45) Date of Patent: Apr. 14, 2026

(54) BABY CARRIER

(71) Applicant: WONDERLAND SWITZERLAND AG, Steinhausen (CH)

(72) Inventor: Wanquan Zhu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 287 days.

(21) Appl. No.: 18/456,198

(22) Filed: Aug. 25, 2023

(65) Prior Publication Data

US 2024/0067251 A1     Feb. 29, 2024

(30) Foreign Application Priority Data

Aug. 26, 2022     (CN) .......................... 202211034675.9

(51) Int. Cl.
    B62B 7/08              (2006.01)
(52) U.S. Cl.
    CPC ............ B62B 7/08 (2013.01); B62B 2205/24 (2013.01)
(58) Field of Classification Search
    CPC ... B62B 7/08; B62B 2205/24; B62B 2205/20; B62B 7/062; B62B 9/00; B62B 7/083; B62B 7/068; B62B 7/06; F16C 11/10; F16C 2326/20
    See application file for complete search history.

(56) References Cited

U.S. PATENT DOCUMENTS 7,798,500 B2 * 9/2010 Den Boer ............... B62B 7/142
                                                        280/47.38
9,638,243 B2 * 5/2017 Li ........................... F16C 11/10

9,718,488 B2 * 8/2017 Singh ...................... B62B 7/068
10,000,226 B2 * 6/2018 Yi ........................... B62B 7/062
2008/0088116 A1 * 4/2008 Den Boer ............... B62B 7/142
                                                        280/650
2012/0223508 A1 * 9/2012 Ohnishi ................... B62B 7/08
                                                        280/642
2014/0064829 A1 * 3/2014 Li ........................... B62B 9/005
                                                        403/81

(Continued)

FOREIGN PATENT DOCUMENTS

CN        105235733 A  *  1/2016  ............... B62B 7/06
CN        103661544 B  *  3/2016  ............... B62B 7/08

(Continued)

OTHER PUBLICATIONS

Translated DE-202018104948-U1 (Year: 2025).*

(Continued)

*Primary Examiner* — James A Shriver, II
*Assistant Examiner* — Ian Bryce Shelton
(74) *Attorney, Agent, or Firm* — HAUPTMAN HAM, LLP

(57) ABSTRACT

A baby carrier includes a frame body and a locking mechanism. The frame body is configured to be selectively folded or unfolded, and includes a rod and a pivotable joint-component. The rod is connected to the joint-component, and a pivot of the joint-component is configured to deviate from a connection between the rod and the joint-component. The locking mechanism is slidably arranged on the rod, and is movable between a locking position restricting pivoting of the joint-component and a releasing position allowing the pivoting of the joint-component.

20 Claims, 17 Drawing Sheets

(56) References Cited

U.S. PATENT DOCUMENTS

| | | | | |
|---|---|---|---|---|
| 2015/0123381 A1 * | 5/2015 | Singh | ........................ | B62B 3/02 |
| | | | | 280/650 |
| 2020/0172142 A1 * | 6/2020 | Young | ..................... | B62B 7/142 |
| 2022/0153333 A1 * | 5/2022 | Holleis | ..................... | B62B 9/00 |

FOREIGN PATENT DOCUMENTS

| | | | | | | |
|---|---|---|---|---|---|---|
| CN | 105644605 A | * | 6/2016 | ............... | B62B 7/06 |
| CN | 107235062 A | * | 10/2017 | ............ | B62B 7/062 |
| CN | 107804363 A | * | 3/2018 | ............... | B62B 9/00 |
| CN | 207697798 U | * | 8/2018 | ............... | B62B 9/10 |
| CN | 208453074 U | * | 2/2019 | ............ | B62B 7/142 |
| CN | 110329336 A | * | 10/2019 | ............ | B62B 7/086 |
| CN | 110733553 A | | 1/2020 | | |
| DE | 202018104948 U1 | * | 10/2018 | ............ | B62B 7/142 |
| DE | 202021105009 U1 | * | 9/2021 | ............ | B62B 7/083 |
| EP | 2871112 A2 | * | 5/2015 | ............ | B62B 7/068 |
| TW | 201408526 A | * | 3/2014 | ............... | B62B 7/08 |

OTHER PUBLICATIONS

First Office Action in Corresponding Taiwan Application No. 113127735, dated Nov. 15, 2024; 9 pgs.
Extended European Search Report issued in corresponding European Application No. 23193756.6, dated Jan. 30, 2024, pp. 1-7.
Taiwanese Office Action issued in corresponding Taiwanese Application No. 112132158, dated Jan. 17, 2024, pp. 1-23.

* cited by examiner

BABY CARRIER

CROSS REFERENCE TO RELATED APPLICATION

The present application claims the priority of Chinese Patent Application No. 202211034675.9, filed on Aug. 26, 2022, entitled "BABY CARRIER", which is hereby incorporated by reference in its entirety.

TECHNICAL FIELD

The invention relates to the technical field of baby products, in particular to a baby carrier.

BACKGROUND

With the continuous development of the economy and the continuous advancement of science and technology, baby carriers, such as strollers and baby seats, are becoming more and more popular. The baby carrier provides great convenience for a user to take care of a baby. The baby carrier is generally provided with a locking mechanism that locks the baby carrier to be in a folded state. However, for the current locking mechanisms, the user usually needs to bend down to operate them, thus making the operation inconvenient. Moreover, structures of most of the current locking mechanisms are complicated, which affects the overall appearances of the baby carriers.

SUMMARY

Based on this, in order to address the technical problem above, it is necessary to provide a baby carrier having a locking mechanism. The locking mechanism has a simple structure and is easy to operate, and when performing an unlocking operation to make the baby carrier to be unfolded from a folded state, the user needs not to bend down.

In order to achieve the objective above, an embodiment of the present invention provides a baby carrier, including a frame body and a locking mechanism.

The frame body is configured to be selectively folded or unfolded and includes a rod and a pivotable joint-component. The rod is connected to the joint-component, and a pivot of the joint-component is configured to deviate from a connection between the rod and the joint-component.

The locking mechanism is slidably arranged on the rod, and is movable between a locking position restricting pivoting of the joint-component and a releasing position allowing the pivoting of the joint-component.

In the baby carrier of the present application, the locking mechanism has a simple structure. By arranging the locking mechanism slidably on the rod, on one hand, the locking mechanism may be operated very conveniently to lock the baby carrier. On the other hand, the overall appearance of the baby carrier will not be affected, thereby making the appearance of the baby carrier more concise.

In one of the embodiments, the locking mechanism includes a locking member and a resetting member.

The locking member engages with the joint-component to restrict the pivoting of the joint-component when the locking mechanism is in the locking position.

The resetting member is configured to constantly drive the locking member to move to the locking position.

In one of the embodiments, the locking mechanism further includes a stopping member, and the stopping member is connected to the rod.

One end of the resetting member abuts against or is connected to the stopping member, and another end of the resetting member is adapted to push the locking member.

In one of the embodiments, the locking mechanism further includes a releasing component, and the releasing component is adapted to operatively switch the locking mechanism from the locking position to the releasing position.

In one of the embodiments, at least a portion of the rod, where the locking member is arranged, is hollow, and the locking member is arranged in the hollow portion of the rod and is movable in a direction parallel to an axial direction of the rod.

The locking mechanism further includes a releasing component. The releasing component is connected to the locking member, and the releasing component includes an operating member and a second connecting member. The operating member is arranged on an outer side of the rod. One end of the second connecting member is connected to the operating member, and another end of the second connecting member is inserted in the rod and connected to the locking member.

In one of the embodiments, the rod is provided with a limiting elongated-groove forming a travel range of a sliding of the locking member, and the second connecting member is inserted in the limiting elongated-groove to connect the operating member and the locking member.

In one of the embodiments, the operating member is an operating sleeve fitting over an outer side of the rod.

In one of the embodiments, the locking mechanism further comprises a fixing member; the fixing member is arranged inside the rod and is movable along a direction parallel to a longitudinal direction of the rod; and the locking member is connected to the releasing component through the fixing member.

In one of the embodiments, the fixing member is a fixing sleeve. The fixing member has a fixing chamber extending along a direction parallel to the longitudinal direction of the rod, and the locking member is inserted in the fixing chamber.

In one of the embodiments, the locking mechanism further includes a first connecting member, and the locking member is connected to the fixing member through the first connecting member.

In one of the embodiments, the joint-component comprises a first joint and a second joint; the first joint and the second joint are pivotally connected by the pivot. The first joint has a receiving hole, and the second joint has a locking hole.

The locking member comprises a free end. When the locking member is in the locking position, the free end is inserted in and engages with the receiving hole and the locking hole. When the locking member is in the releasing position, the free end disengages from at least one of the receiving hole and the locking hole.

In one of the embodiments, when the frame body is in a folded state, the receiving hole and the locking hole overlap, and the free end is configured to be inserted in an overlapped area of the receiving hole and the locking hole.

In one of the embodiments, both the receiving hole and the locking hole deviate from the pivot of the joint-component.

In one of the embodiments, the locking member is a pin.

In one of the embodiments, there are two joint-components arranged oppositely at two ends of the rod, and the rod is connected between the two joint-components.

In one of the embodiments, pivots of the two joint-components are located on the same straight line.

3

BRIEF DESCRIPTION OF THE DRAWINGS

The above and other objectives, features and advantages of the present invention will become more apparent through a more specific description of preferred embodiments of the present invention shown in the accompanying drawings. The same reference numeral throughout the drawings represents the same part, and the drawings are not intentionally scaled to actual sizes and are mainly intended to illustrate the gist of the present invention.

Other features, objectives and advantages of the present invention will become more obvious through reading the detailed description of non-limiting embodiments with reference to the following drawings.

Figure 1:
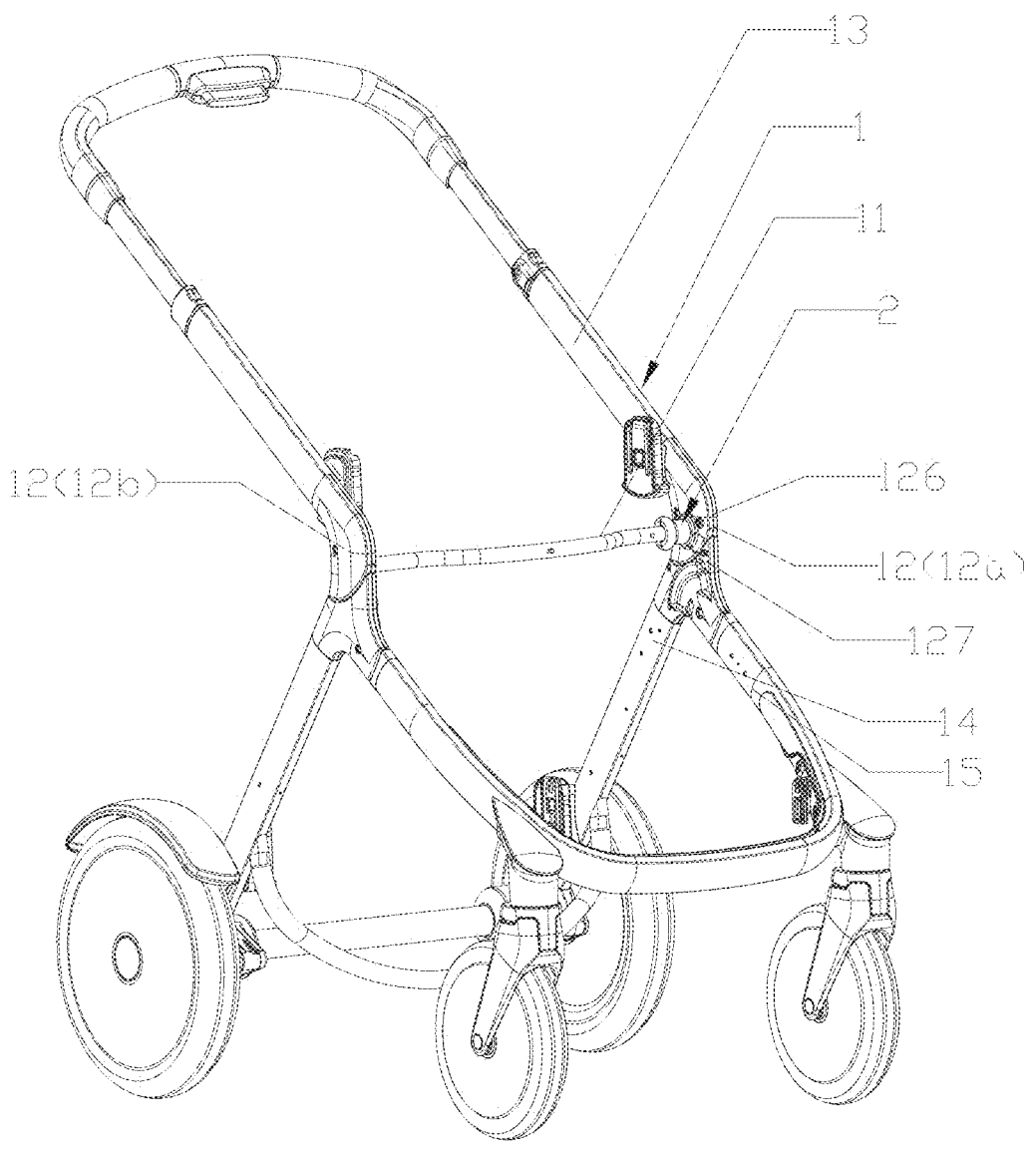
FIG. 1 is a schematic structural view of a baby carrier in an unfolded state according to an embodiment of the present invention.
Figure 2:
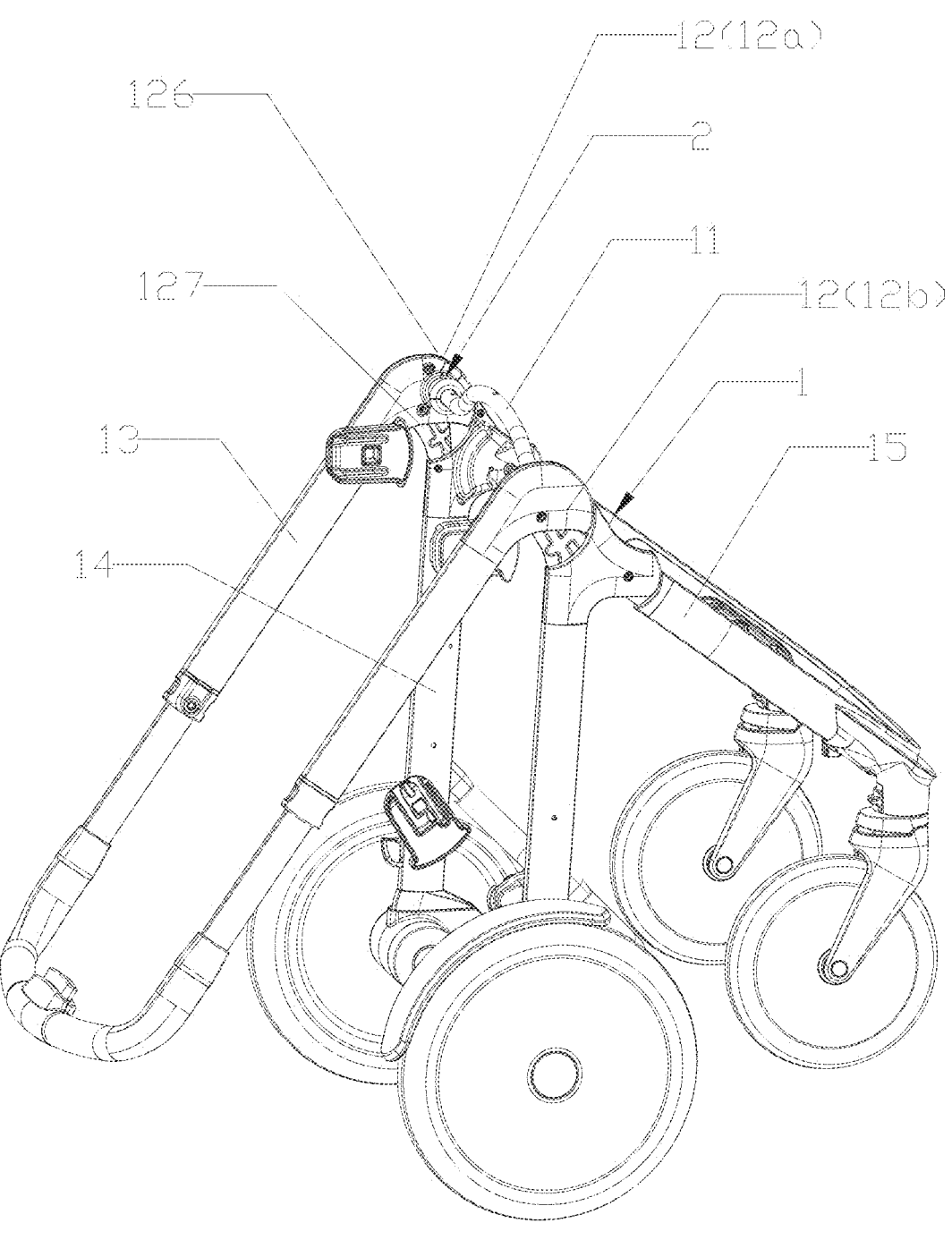
FIG. 2 is a schematic structural view of the baby carrier shown in FIG. 1 in a semi-folded state.
Figure 3:
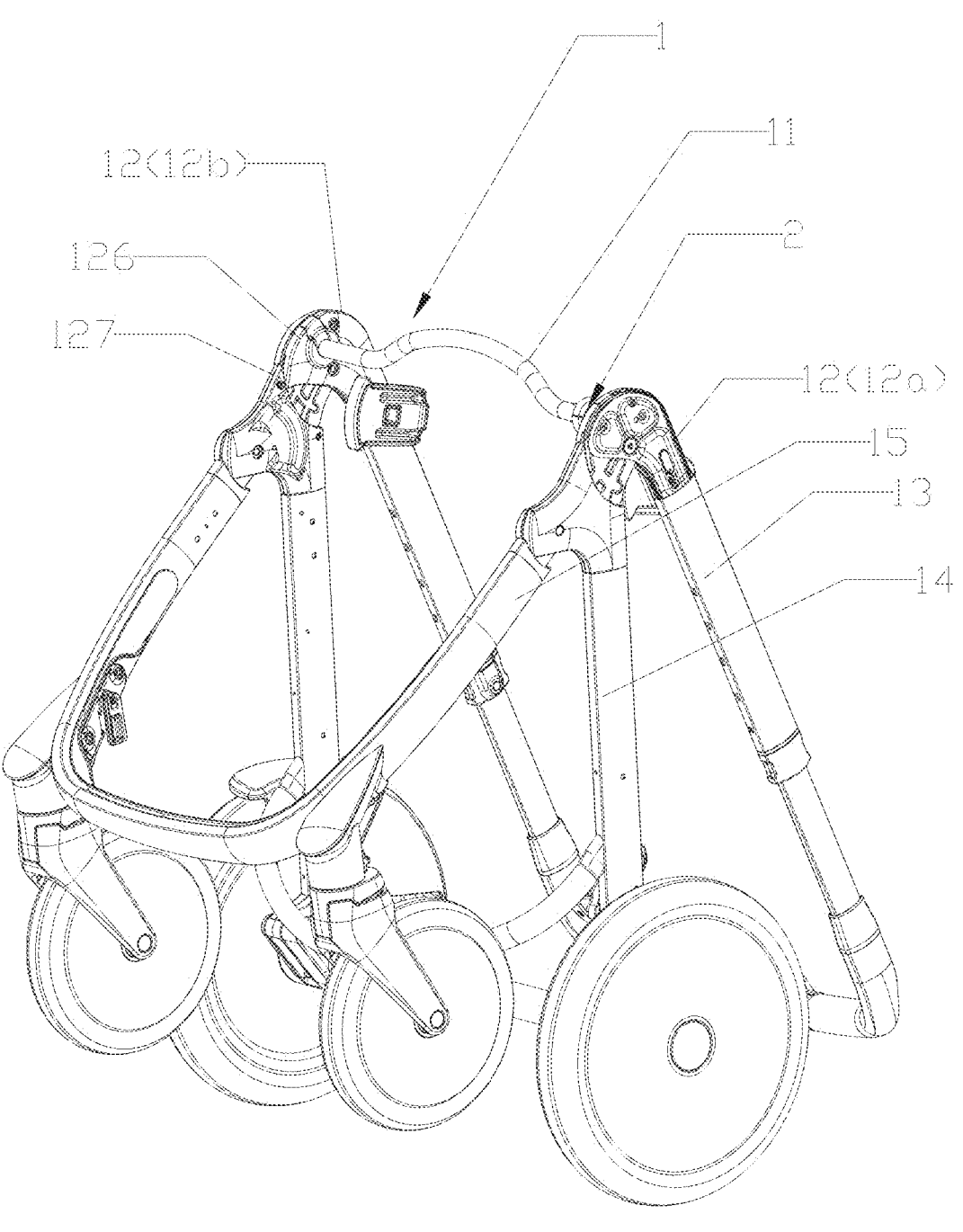
FIG. 3 is a schematic structural view of the baby carrier shown in FIG. 1 in the semi-folded state viewing from another visual angle, where a first housing on one side of the baby carrier is omitted.
Figure 4:
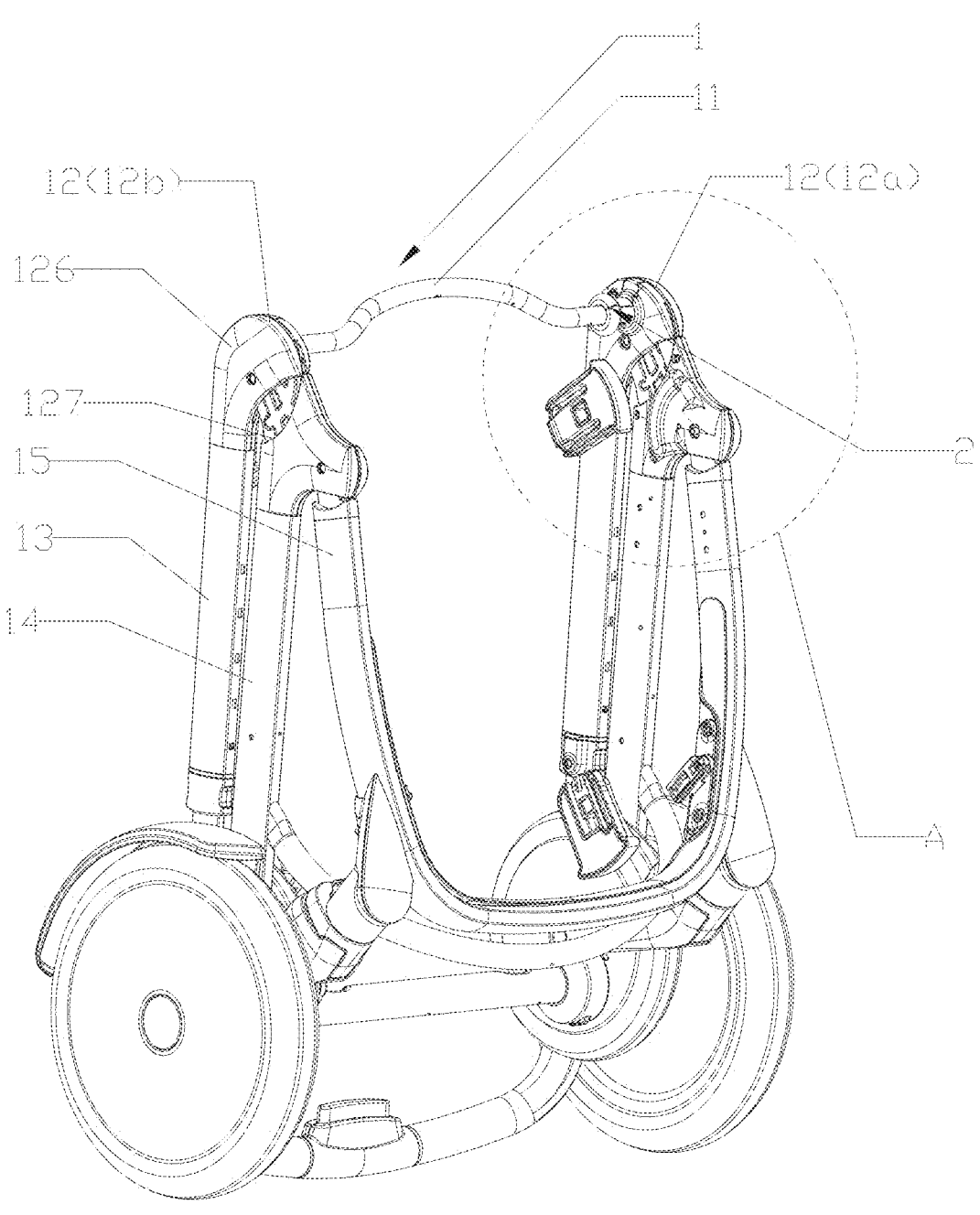
FIG. 4 is a schematic structural view of the baby carrier shown in FIG. 1 in a fully folded state.

EXPLANATION OF REFERENCE SIGNS frame body 1; rod 11; first rod-portion 111; second rod-portion 112; third rod-portion 113; inner cavity 114; limiting elongated-groove 115; joint-component 12; first joint-component 12a; second joint-component 12b; first joint 121; first half-joint 121a, 121b; receiving hole 1211; second joint 122; locking hole 1221; pivot 123; guide groove 125; first housing 126; first housing-portion 1261; second housing-portion 1262; second housing 127; hand-gripping component 13; rear leg support rod 14; front leg support rod 15; locking mechanism 2; locking member 21; fixed end 211; free end 212; fixing member 22; fixing chamber 221; first connecting member 222; resetting member 23; stopping member 24; releasing component 25;

4 operating member 251; sleeve portion 2511; operating portion 2512; second connecting member 252.

DETAILED DESCRIPTION OF EMBODIMENTS

In order to facilitate the understanding of the present invention, the present invention will be described more fully hereinafter with reference to the associated drawings. Some embodiments of the invention are shown in the drawings. However, the present invention may be implemented in various forms and is not limited to the embodiments described herein. On the contrary, these embodiments are provided so that the disclosure of the present invention will be thorough and complete.

It should be noted that, when a component is defined to be "connected" to another component, it may be directly connected to and integrated with the other component, or there may be an intermediate component as well. The terms "mount", "one end", "another end" and similar expressions are used herein for the purpose of description only.

Unless otherwise defined, all technical and scientific terms used herein have the same meaning as commonly understood by those ordinary skill in the art of the invention. The terms in the specification of the present invention are used for describing specific embodiments only, but not intended to limit the present invention. As used herein, the term "and/or" includes any combinations of one or more of the associated items listed.

In order to make the objectives, technical solutions and advantages of the present invention clearer and better understood, the present invention will be further described in detail hereinafter in combination with the accompanying drawings and embodiments. It should be understood that the specific embodiments described herein are only used to explain the present invention, instead of limiting the present invention.

A baby carrier is provided according to an embodiment of the present invention. Specifically, in the embodiment of the present invention, the baby carrier may be a stroller. In some embodiments, the baby carrier may also be a movable or non-movable baby seat, a baby swing frame, a baby basket, or a baby bed, etc., which is not limited in the present invention. Referring to FIG. 1 to FIG. 4, the baby carrier includes a frame body 1, which may be selectively folded or unfolded for use, and a locking mechanism 2. The frame body 1 includes a rod 11 and a pivotable joint-component 12. The rod 11 is configured to be lifted by a user after the frame body 1 is folded. The rod 11 is connected to the joint-component 12, and a pivot 123 (shown in FIG. 5) of the joint-component 12 deviates from a connection between the rod 11 and the joint-component 12. The locking mechanism 2 is slidably arranged on the rod 11, and is movable between a locking position, where the pivoting of the joint-component 12 is restricted, and a releasing position, where the pivoting of the joint-component 12 is allowed, so as to selectively restrict the pivoting of the joint-component 12 or lift the restriction. When the frame body 1 is in the folded state, the locking mechanism 2 engages with the joint-component 12 to restrict the pivoting of the joint-component 12. It should be understood that, in this embodiment, when not specifically designated as a semi-folded state, the folded state herein refers to a fully folded state (shown in FIG. 4). In this case, when the frame body is in the folded state, the locking mechanism 2 engages with the joint-component 12, and the pivoting of the joint-component 12 is restricted by the locking mechanism 2, such that the frame body 1 is locked in the folded state. When the frame body 1 is in an unfolded state (shown in FIG. 1) or in the semi-folded state (shown in FIG. 2 and FIG. 3), the pivoting of the joint-component 12 is not restricted by the locking mechanism 2. In this case, the frame body 1 may be folded or unfolded manually, or the frame body 1 may be folded or unfolded by a folding mechanism (not shown in the drawings) arranged on the frame body 1. For the folding mechanism, a reference may be made to the related art, which will not be described in details in order not to obscure the subject matters of the present application.

In another embodiment, when the frame body 1 is in the semi-folded state or in the unfolded state, the locking mechanism 2 engages with the joint-component 12, so that the frame body 1 is locked in the semi-folded state or in the unfolded state according to user's needs. In other embodiments, when the frame body 1 is in at least two states of the fully folded state, the semi-folded state, and the unfolded state, the locking mechanism 2 engages with the joint-component 12, such that the frame body 1 is locked in an appropriate state according to the user's needs. For example, when the frame body 1 is in the folded state, in the unfolded state, or in the semi-folded state at a specific folding angle, the locking mechanism 2 engages with the joint-component 12, and the frame body 1 is correspondingly locked in the folded state, in the unfolded state, or in the semi-folded state at the specific folding angle, so that the user may choose to lock the frame body 1 in a suitable state according to needs.

In this embodiment, by slidably arranging the locking mechanism 2 on the rod 11, on the one hand, the locking mechanism 2 may be operated very conveniently, and the unlocking or locking of the locking mechanism 2 may be operated without requiring the user to bend down; and on the other hand, the overall appearance of the baby carrier will not be affected, thereby making the appearance of the baby carrier more concise.

Referring to FIG. 1 to FIG. 4, FIG. 8 and FIG. 10, in an embodiment, two joint-components 12, namely a first joint-component 12a and a second joint-component 12b, are provided. The first joint-component 12a and the second joint-component 12b are arranged oppositely at two ends of the rod 11, and the rod 11 is connected between the first joint-component 12a and the second joint-component 12b. Pivots 123 (shown in FIG. 5) of the first joint-component 12a and second joint-component 12b are located on the same straight line, thus making the frame body 1 to be folded or unfolded more smoothly. In this embodiment, the locking mechanism 2 is arranged on an end of the rod 11, which is proximate to the first joint-component 12a. In other embodiments, the locking mechanism 2 is arranged on another end of the rod 11, which is proximate to the second joint-component 12b, or arranged at a central portion between the first joint-component 12a and the second joint-component 12b. Or the locking mechanisms 2 are arranged at two ends of the rod 11, respectively.

Figure 8:
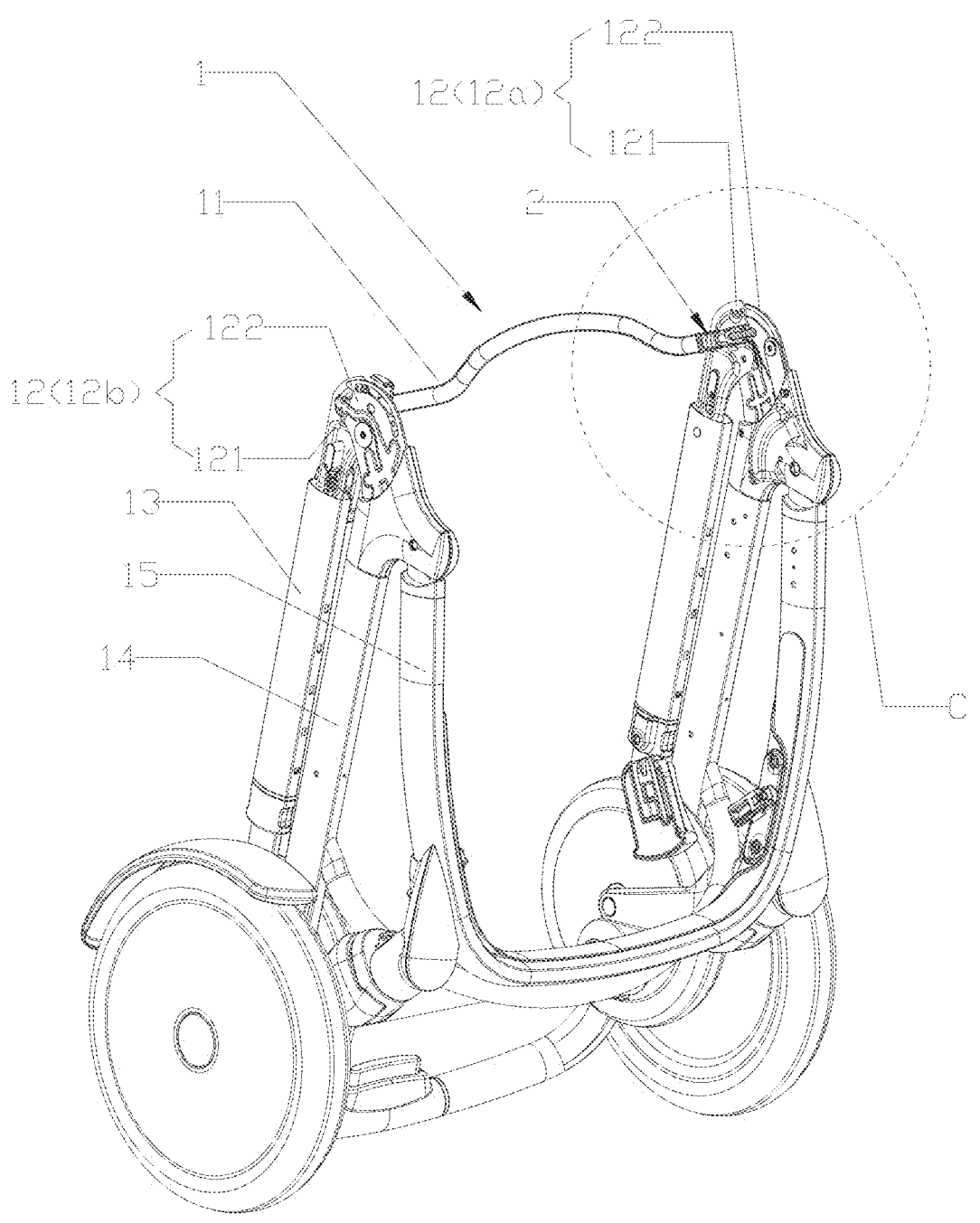
FIG. 8 is a schematic partial-sectional view illustrating the structure of the baby carrier shown in FIG. 4, where the first housing on one side the baby carrier is omitted.

Referring to FIG. 1, FIG. 7, FIG. 9 and FIG. 11, each joint-component 12 (12a, 12b) includes a first joint 121 and a second joint 122. The first joint 121 and the second joint 122 are pivotably connected through the pivot 123. Referring to FIG. 8, the first joint 121 of the joint-component 12 is connected to a hand-gripping component 13 of the frame body 1, and a second joint 122 of the joint-component 12 is connected to a rear leg support rod 14 of the frame body 1. The first joint 121 is provided with a boss, and a guide groove 125 (shown in FIG. 9 or FIG. 11) is formed on the second joint 122 to guide the boss to slide therealong. When the first joint 121 pivots relative to the second joint 122, the boss slides along the guide groove 125. Alternatively, the second joint 122 is provided with the boss, and the guide groove 125 is formed on the first joint 121 to guide the boss to slide therealong. In this embodiment, the guide groove 125 is an elongated arc-shaped groove or hole, and is configured to define a pivoting path of the first joint 121 relative to the second joint 122. Referring to FIG. 7, FIG. 9, FIG. 11 and FIG. 16, in this embodiment, the first joint 121 has a receiving hole 1211 (shown in FIG. 7), and the second joint 122 has a locking hole 1221 (shown in FIG. 9). Both the receiving hole 1211 and the locking hole 1221 deviate from the pivot 123 of the joint-component 12. The first joint 121 is formed by fastening two first half-joints (121a and 121b), and the second joint 122 is clamped between the two first half-joints (121a and 121b) and is pivotable relative to the first joint 121. In other embodiments, the second joint 122 is formed by fastening two second half-joints (not shown in the drawings), and the first joint 121 is clamped between the two second half-joints and is pivotable relative to the second joint 122.

Figure 9:
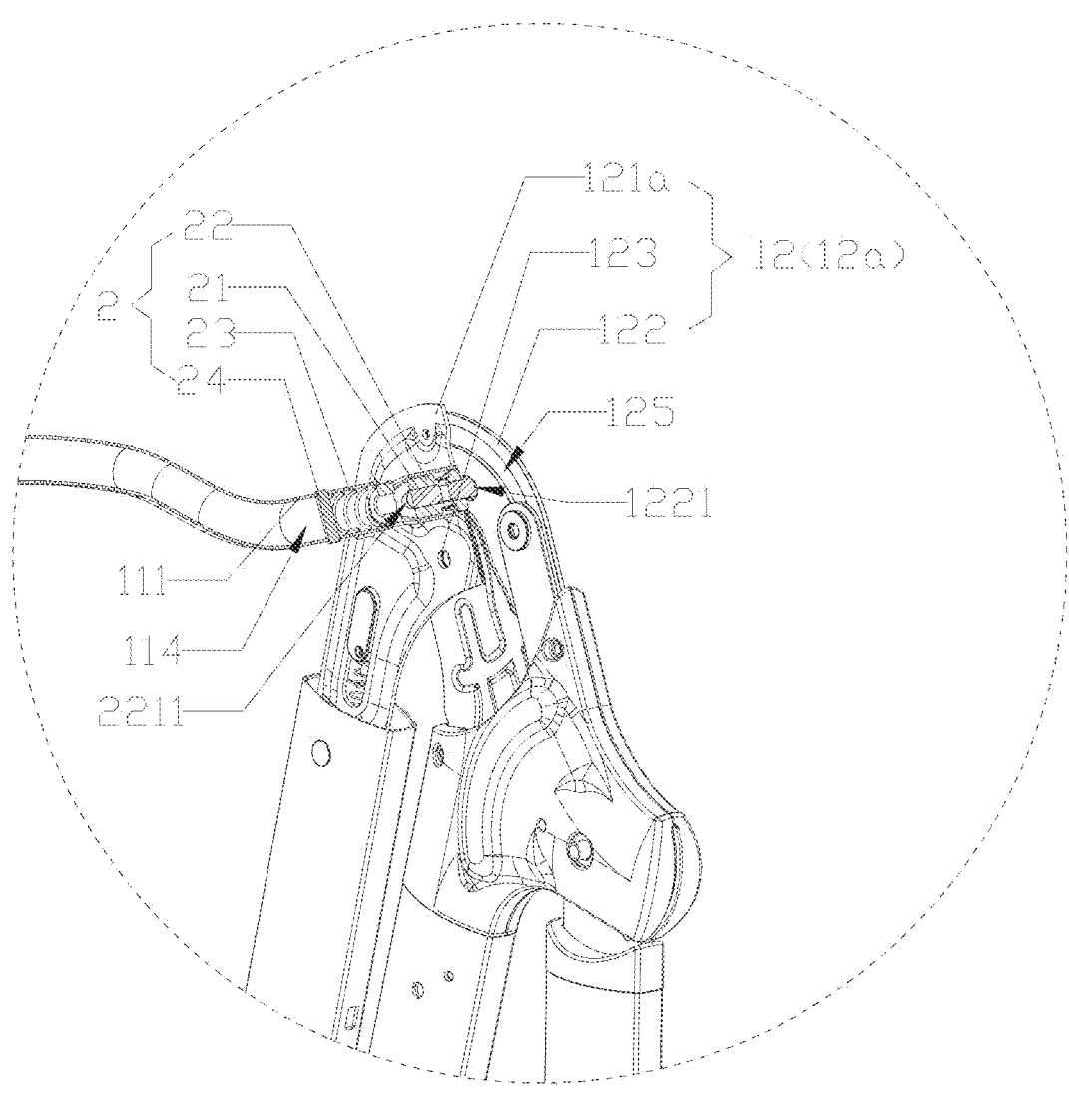
FIG. 9 is an enlarged view of a portion C in FIG. 8.
Figure 10:
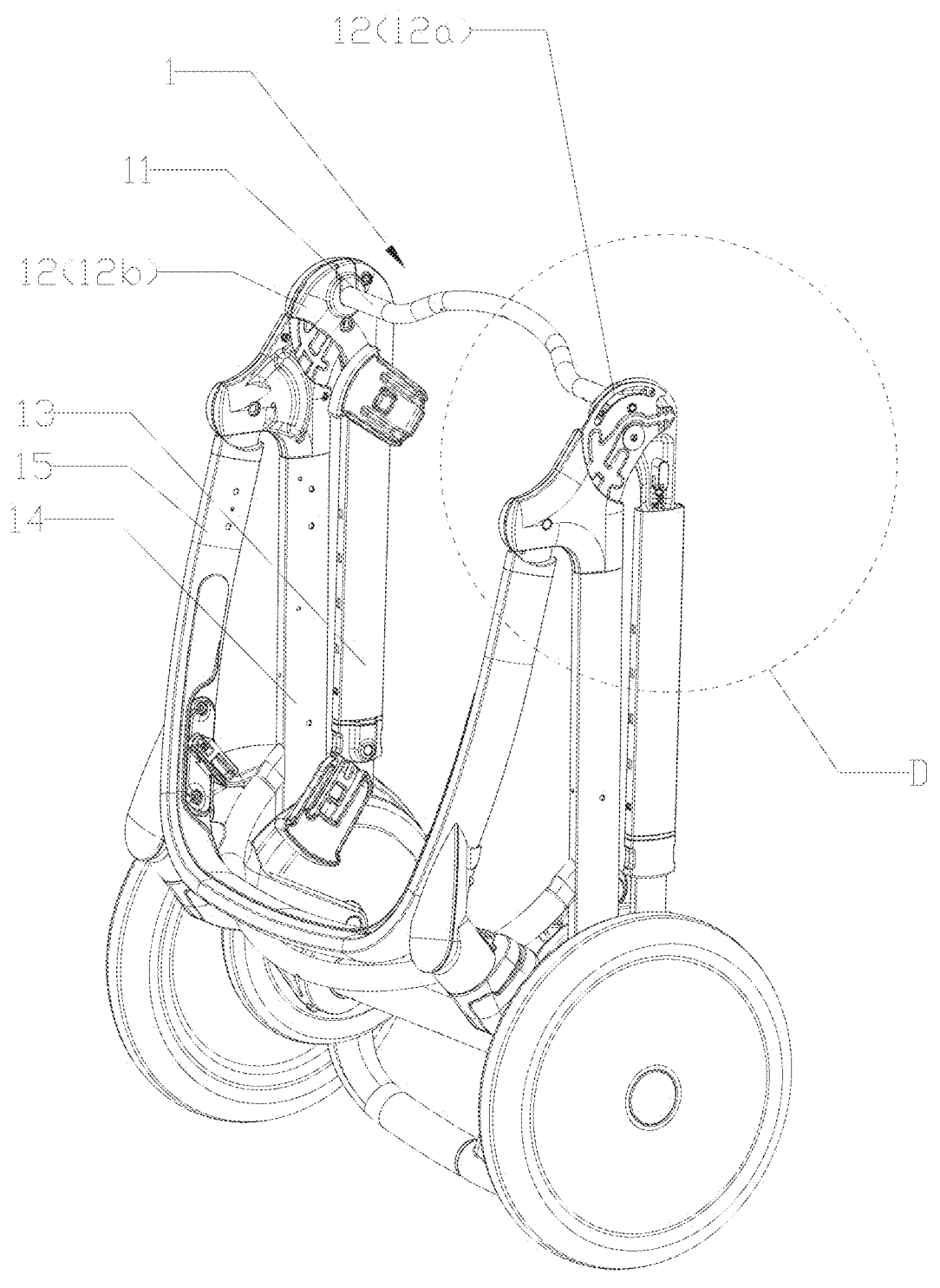
FIG. 10 is a schematic structural view of the baby carrier shown in FIG. 4 viewing from another visual angle, where the first housing and part of a first half-joint are omitted.
Figure 11:
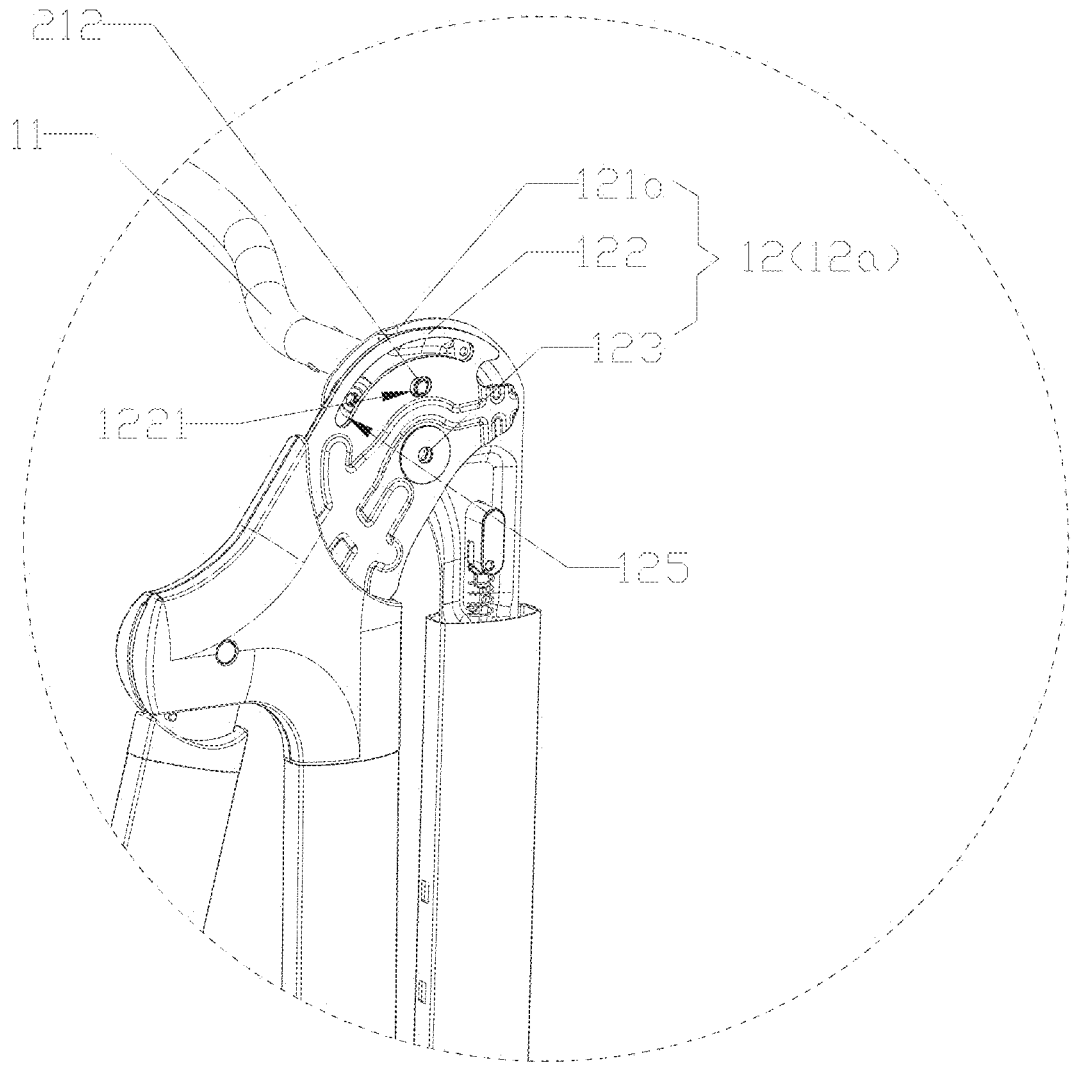
FIG. 11 is an enlarged view of a portion D in FIG. 10.
Figure 12:
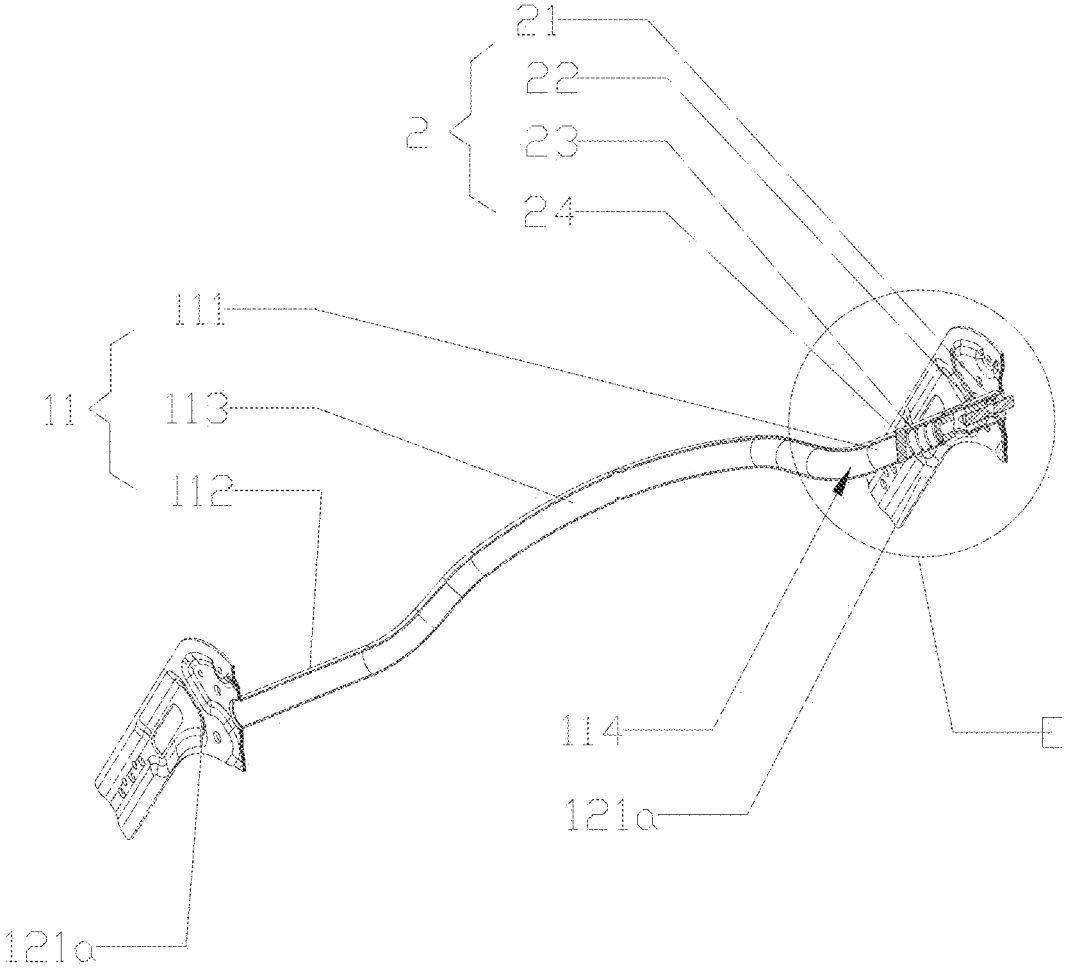
FIG. 12 is an assembly view of the rod, part of a joint-component and part of a locking mechanism.
Figure 13:
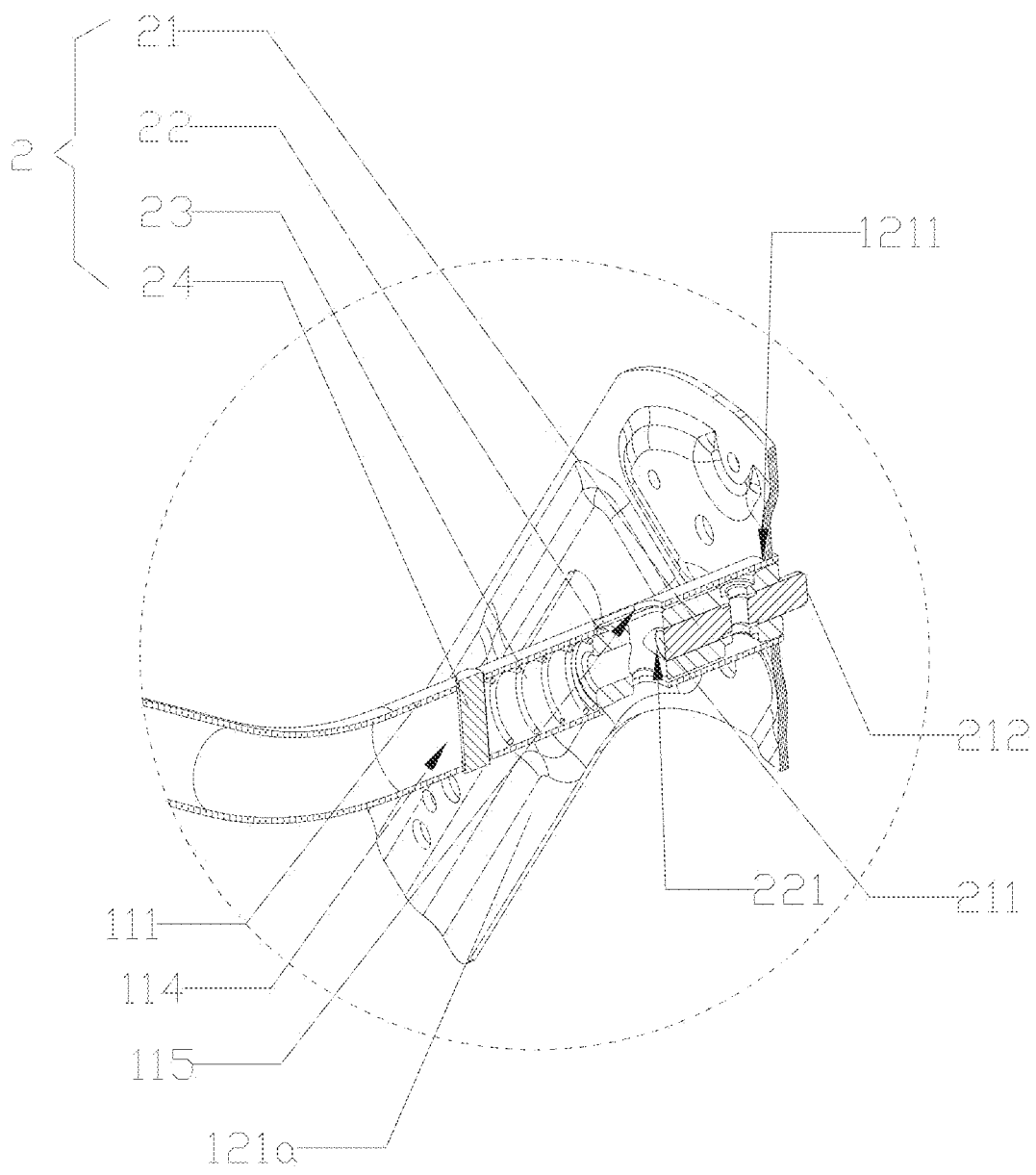
FIG. 13 is an enlarged view of a portion E in FIG. 12.
Figure 14:
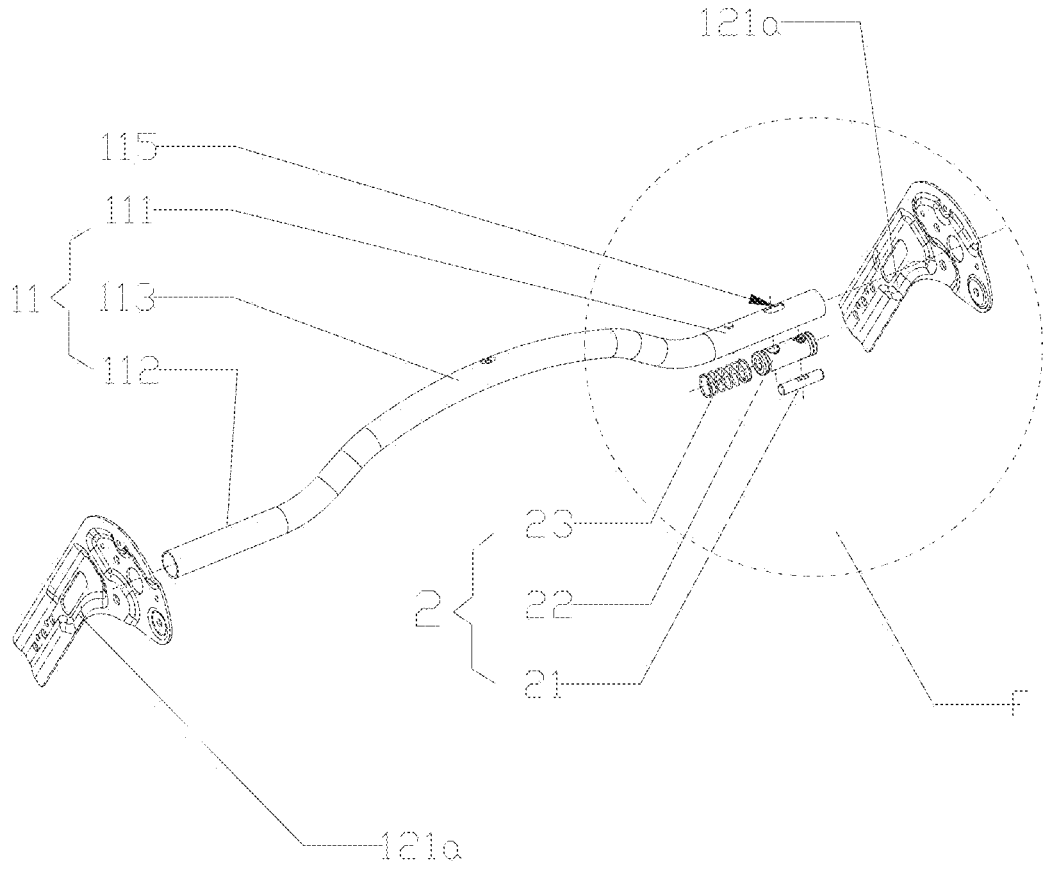
FIG. 14 is an exploded view of the rod, part of the joint-component and part of the locking mechanism.
Figure 15:
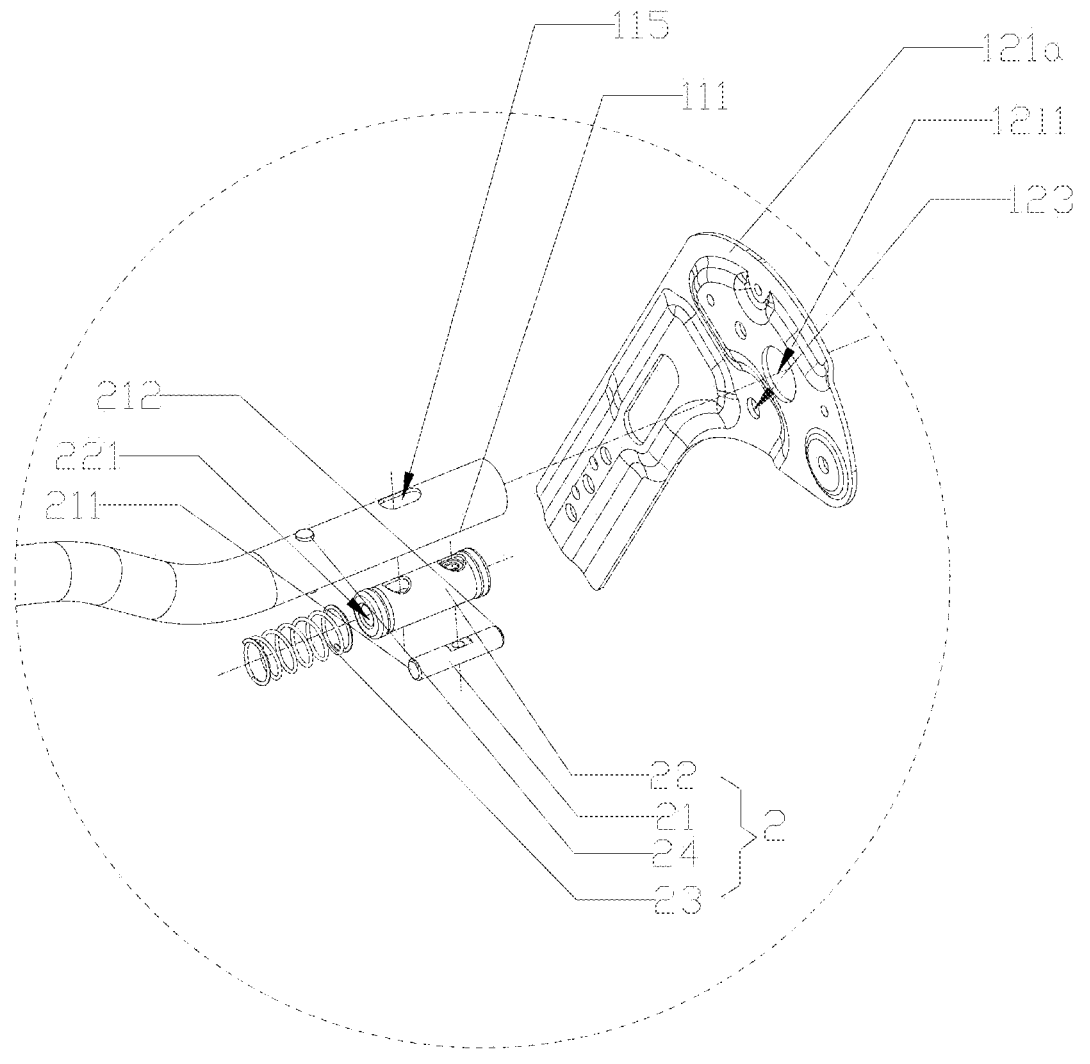
FIG. 15 is an enlarged view of a portion F in FIG. 14.
Figure 16:
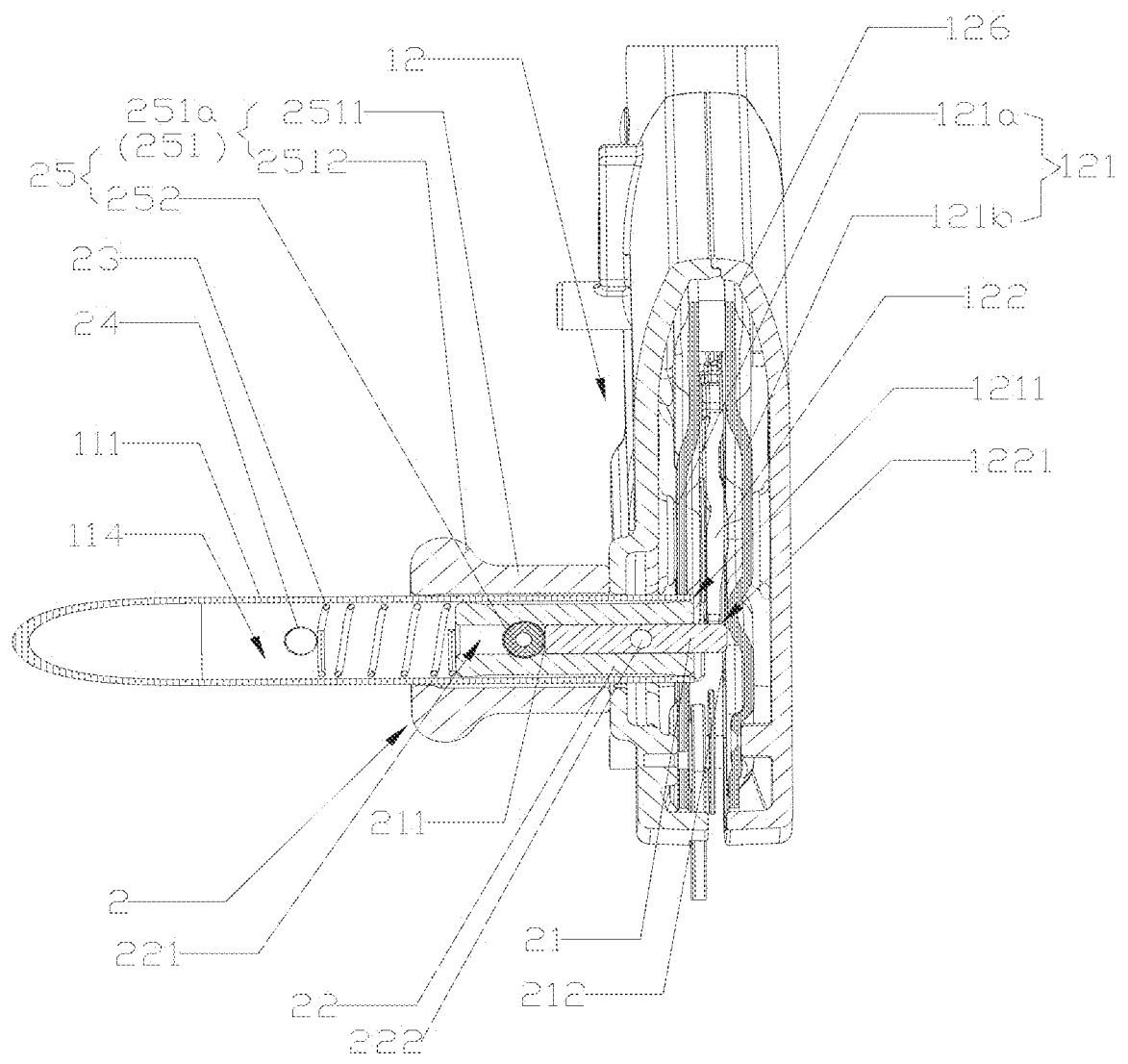
FIG. 16 is a partial sectional view illustrating a connection between the rod and the joint-component when the locking member is in a locking position.

Referring to FIG. 9, FIG. 11 and FIG. 16, the rod 11 is connected to the first half-joint 121a located at an inner side of the baby carrier, and the receiving hole 1211 is formed in the first half-joint 121a, and no receiving hole 1211 is formed in the first half-joint 121b located at an outer side. In other embodiments, each of the first half-joints (121a and 121b) have a receiving hole 1211. In other embodiments that the second joint 122 is formed by fastening the two second half-joints, the rod 11 is connected to the second half-joint located at the inner side, and the receiving hole is formed in the second half-joint, and no receiving hole is formed in the second half-joint located at the outer side. Similarly, each of the second half-joints have a receiving hole.

Figure 5:
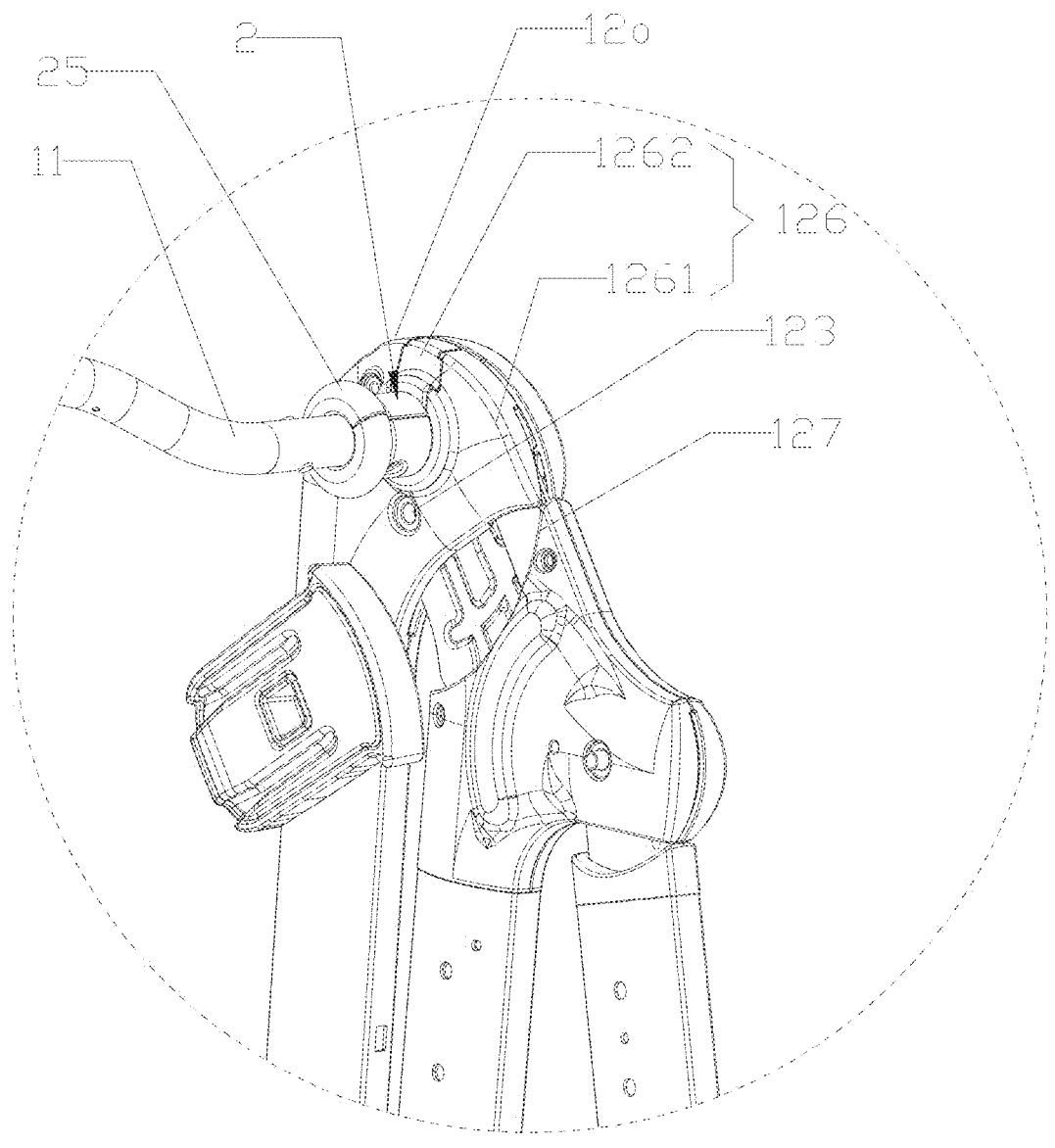
FIG. 5 is an enlarged schematic view of location A in FIG. 4.
Figure 6:
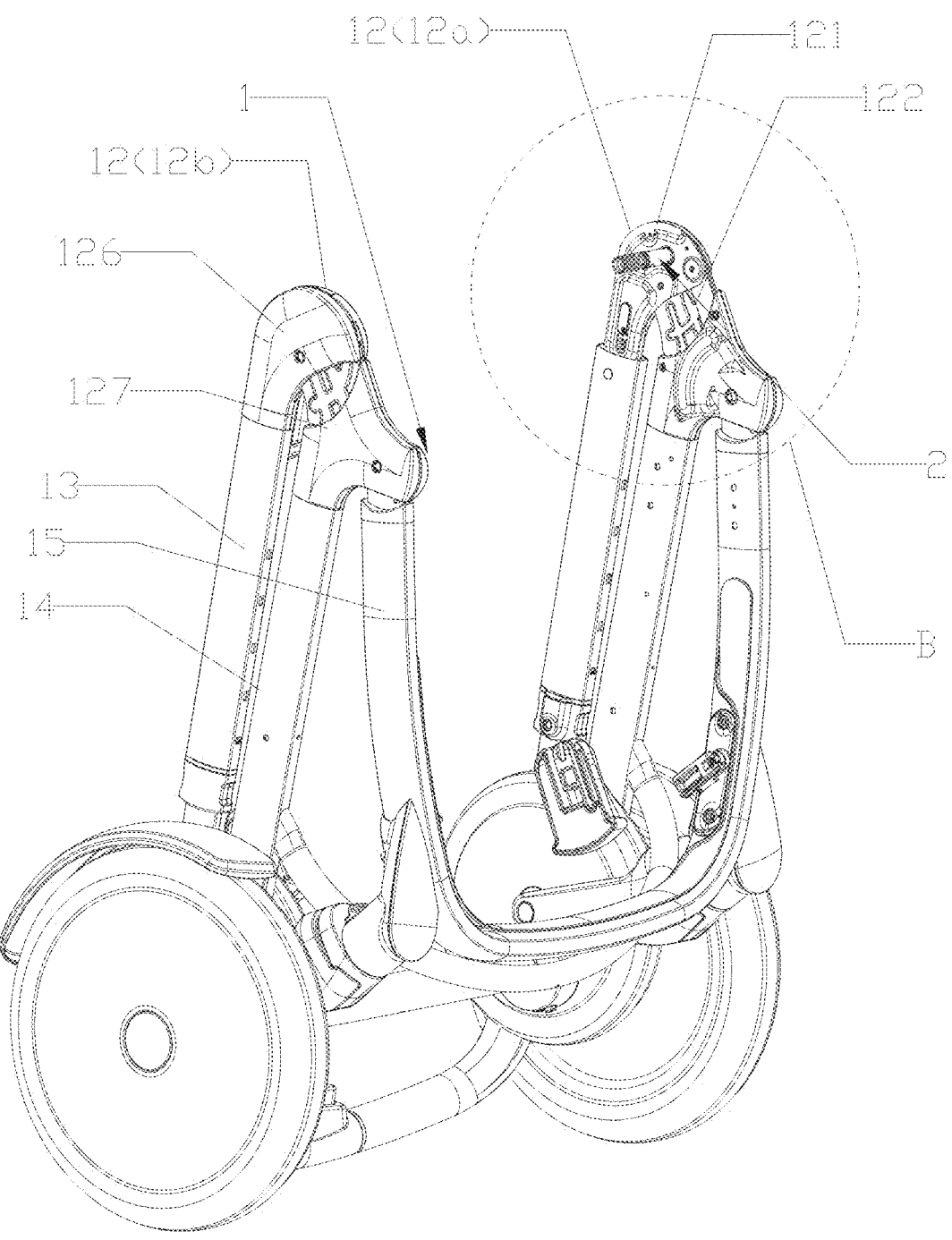
FIG. 6 is a schematic structural view of the baby carrier shown in FIG. 4, where the first housing on one side and a rod are omitted.
Figure 7:
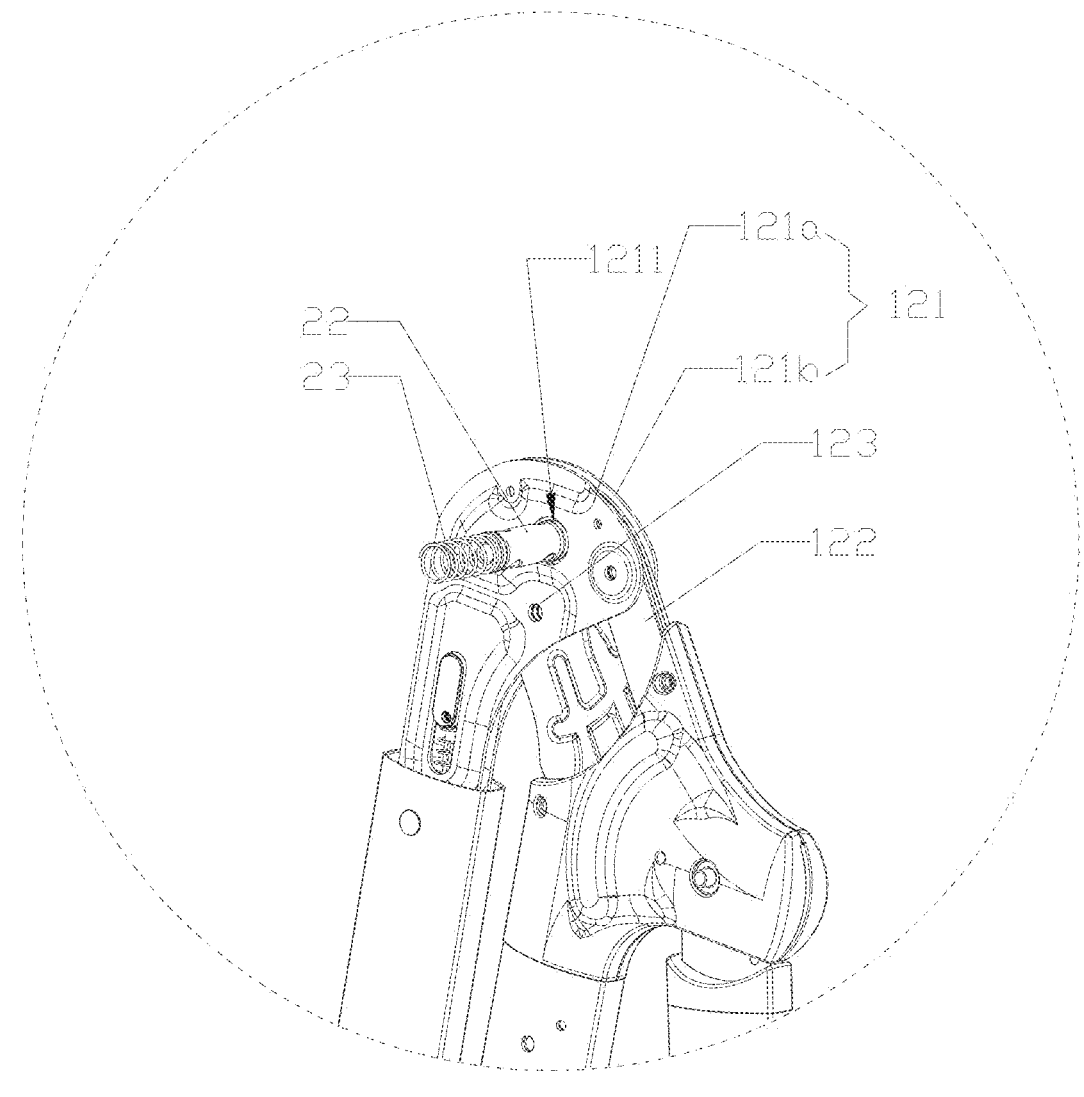
FIG. 7 is an enlarged view of a portion B in FIG. 6.

In this embodiment, as shown in FIGS. 1 to 5, in order to make the appearance of the frame body 1 more concise and beautiful and to avoid clamping the user's hand, the joint-component 12 further includes a first housing 126 covering the first joint 121 and a second housing 127 covering the second joint 122, so as to form a smooth outer contour together with the housings of the rear leg support rod 14, the front leg support rod 15, and the hand-gripping component 13, respectively. As shown in FIG. 5, for the convenience of assembly, the first housing 126 includes a first housing-portion 1261 and a second housing-portion 1262. The first housing-portion 1261 and the second housing-portion 1262 surround to form a connection hole, allowing the rod 11 to pass through. Referring to FIG. 8, FIG. 10, FIG. 16 and FIG. 17, two ends of the rod 11 are connected to the first joints 121 on two sides respectively through the connecting holes. In this embodiment, the rod 11 is fixedly connected to each first joint 121 by means of welding or fusing. In some embodiments, the rod 11 may also be connected to the first joint 121 by means of bonding, threading, clamping or the like. In other embodiments that the second joint 122 is fastened by the two second half-joints, two ends of the rod 11 are connected to the second joints 122 on two sides respectively through a corresponding second housing 127.

Referring to FIGS. 12 to 15, in an embodiment, the rod 11 includes a first rod-portion 111 connected to the first joint-component 12a, a second rod-portion 112 connected to the second joint-component 12b, and a third rod-portion 113 connected between the first rod-portion 111 and the second rod-portion 112. The axis of the first rod-portion 111 and the axis of the second rod-portion 112 coincide with each other and are parallel to the pivot 123 of the joint-component 12. For conveniently lifting the baby carrier by the user, the third rod-portion 113 is an upwardly convex curved rod. To facilitate assembly and disassembly, two ends of the third rod-portion 113 are detachably connected to the first rod-portion 111 and the second rod-portion 112, respectively. It should be noted that the first rod-portion 111, the second rod-portion 112 and the third rod-portion 113 may also be integrally formed. In some embodiments, at least a portion of the rod 11, where the locking member 21 is arranged, is hollow, and the locking member 21 is arranged in the hollow portion of the rod and is movable in a direction parallel to an axial direction of the rod. In this embodiment, the first rod-portion 111 is a hollow rod with an inner cavity 114, and a limiting elongated-groove 115 is formed in the first rod-portion 111 (shown in FIG. 13 and FIG. 15). The locking mechanism 2 is arranged inside the first rod-portion 111. The second rod-portion 112 may be a hollow rod or a solid rod. In another embodiment, both the second rod-portion 112 and the third rod-portion 113 may be hollow rods, so as to reduce the overall weight of the frame body 1 and facilitate the lifting by the user. In this embodiment, the first rod-portion 111, the second rod-portion 112 and the third rod-portion 113 is made of metal material, so that the rod 11 has a higher strength. In some embodiments, the first rod-portion 111, the second rod-portion 112 and the third rod-portion 113 is made of plastic, etc., as along as the strength of the rod 11 is satisfying.

Figure 17:
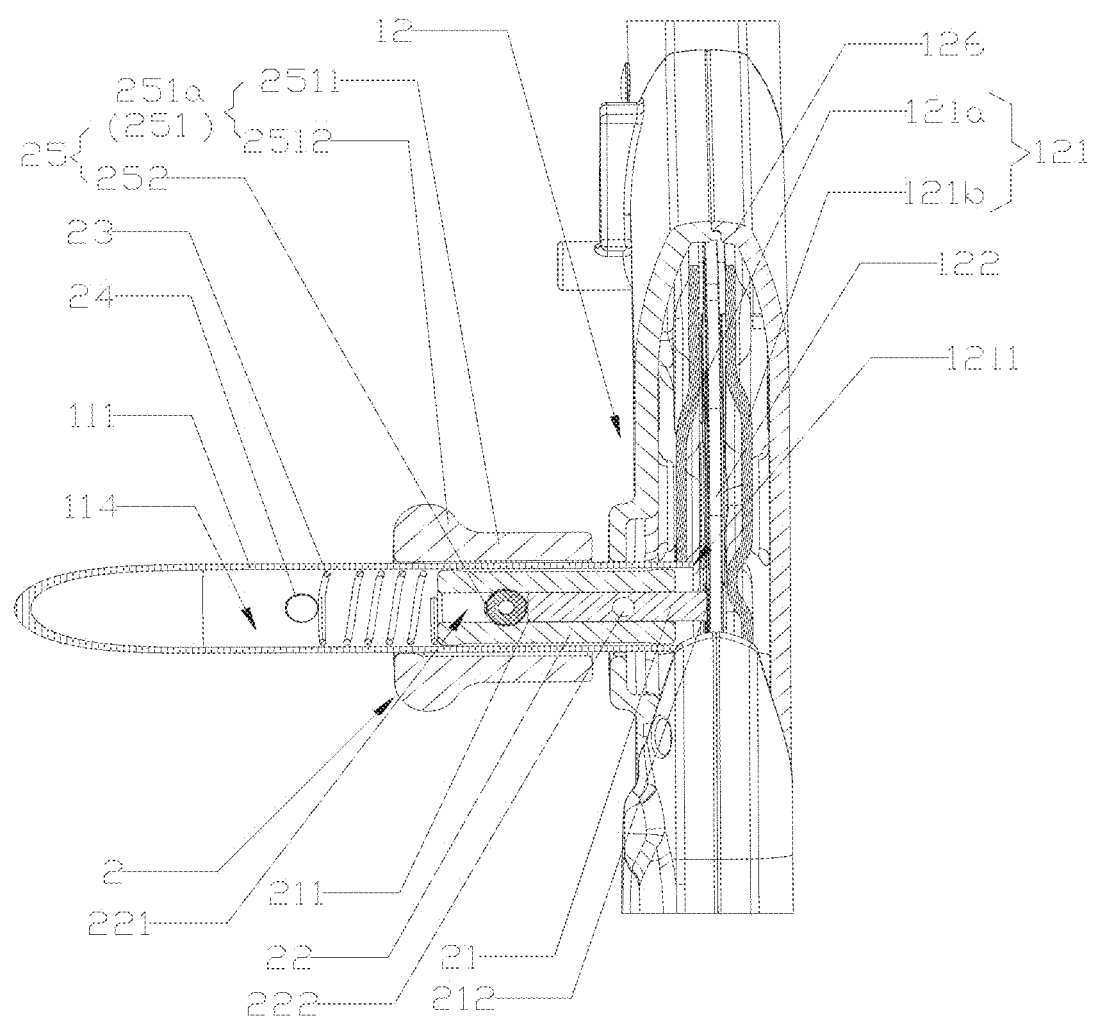
FIG. 17 is a partial sectional view illustrating a connection between the rod and the joint-component when the locking member is in a releasing position.

Referring to FIG. 12 to FIG. 17, in this embodiment, the locking mechanism 2 includes a locking member 21, a fixing member 22, a resetting member 23, a stopping member 24 and a releasing component 25 (shown in FIG. 16 and FIG. 17). The fixing member 22 may be sleeve-shaped, and there is a clearance fit between an outer contour of the fixing member 22 and an inner side wall of the first rod-portion 111, such that the fixing member 22 may slide inside the first rod-portion 111. The releasing component 25 may include a pulling handle configured for the user to pull along a longitudinal direction of the first rod-portion 111 to unlock the frame body 1. It should be noted that the longitudinal direction of the first rod-portion 111 refers to a length extending direction of the first rod-portion 111. The locking member 21 is movably arranged on the rod 11. The locking member 21 has a locking position, in which the pivoting of the joint-component 12 is restricted, and a releasing position, in which the pivoting of the joint-component 12 is allowed. The locking member 21 is connected to the releasing component 25 through the fixing member 22. The stopping member 24 is connected to the rod 11. In an embodiment, at least part of the stopping member 24 is disposed inside the rod 11. One end of the resetting member 23 abuts against or is connected to the stopping member 24, and the stopping member 24 is configured to stop the resetting member 23 inside the rod 11 from moving away from the joint-component 12. The other end of the resetting member 23 pushes the fixing member 22, providing a pressure to force the fixing member 22 constantly to drive the locking member 21 to move to the locking position. When the frame body 1 of the baby carrier is in the folded state, the locking member 21 may be pushed by the resetting member 23 to move to the locking position, so that the frame body 1 is locked in the folded state. The releasing component 25 may be operated to switch the locking member 21 from the locking position to the releasing position, thereby releasing the joint-component 12 from the restriction and the locking performed by the locking member 21, so that the frame body 1 may be unfolded from the folded state.

Referring to FIG. 16 and FIG. 17, in this embodiment, the locking member 21 is movably arranged inside the rod 11, specifically, inside the first rod-portion 111. The fixing member 22 is disposed inside the inner cavity 114 of the hollow rod and is movable in a direction parallel to the longitudinal direction of the hollow rod. The fixing member 22 is connected to the releasing component 25, and is connected to the locking member 21 through the first connecting member 222. In some embodiment, the fixing member 22 is a fixing sleeve arranged along the longitudinal direction of the hollow rod, and the fixing sleeve has a fixing chamber 221 extending along a direction parallel to the longitudinal direction of the hollow rod. The locking member 21 is inserted in the fixing chamber 221, and the first connecting member 222 is configured to pass through the fixing member 22 and the locking member 21 along a direction substantially perpendicular to the longitudinal direction of the fixing chamber 221, so as to connect the fixing member 22 and the locking member 21 together. It should be noted that, in this embodiment, the longitudinal direction of the hollow rod refers to the length extending direction of the hollow rod. The longitudinal direction of the fixing chamber 2211 refers to an extending direction of the fixing chamber 2211.

In some embodiments, the first connecting member 222 is a pin, a screw, a rivet, and the like. In this embodiment, the first connecting member 222 is a pin. In other embodiments, the locking member 21 and the fixing member 22 may be connected not by the first connecting member 222. For example, the locking member 21 and the fixing member 22 are connected by means of adhesive, a threaded connection, a clamping connection, or an interference fit, etc., which is not limited in the present invention. In some embodiments, the material of the fixing member 22 is different from those of the locking member 21 and first rod-portion 111. In this embodiment, the fixing member 22 is made of plastic. It should be noted that, in other embodiments, the fixing member 22 may also be made of wood, or the like. A direct contact between the locking member 21 and the cavity wall of the inner cavity 114 can be avoided by the fixing member 22, which can not only reduce the noise and abrasion caused when the locking member 21 moves in the inner cavity 114, but also avoid a problem of high tolerance requirements existing in the direct contact between the locking member 21 and the cavity wall of the inner cavity 114, so that the locking member 21 can move more smoothly in the rod 11. It should be noted that, in other embodiments, no fixing member 22 is provided, but the locking member 21 and the releasing component 25 are directly connected, which may allow the locking member 21 to move inside the hollow rod as well.

Referring to FIGS. 16 and 17, in this embodiment, the releasing component 25 includes an operating member 251 and a second connecting member 252. The operating member 251 is located on an outer surface of the first rod-portion 111, one end of the second connecting member 252 is connected to the operating member 251, and the other end is connected to the fixing member 22 after passing through the limiting elongated-groove 115 (shown in FIG. 13 and FIG. 15). The second connecting member 252 may move back and forth within a travel range of the limiting elongated-groove 115, so that the locking member 21 can slide within a certain travel range, thereby limiting a travel range of the locking member 21 while the locking member 21 slides in the hollow rod. As shown in FIGS. 16 and 17, in this embodiment, the operating member 251 is an operating sleeve 251a that fits over the hollow rod and surrounds the outer side thereof. The operating sleeve 251a may slide back and forth along the hollow rod, so that the locking member 21 may be switched between the locking position and the releasing position. In this embodiment, the operating sleeve 251*a* includes a sleeve portion 2511 and an operating portion 2512 connected to each other. The operating portion 2512 protrudes relative to the outer surface of the sleeve portion 2511 to facilitate the user's operation. The operating portion 2512 is in a curved transition with the sleeve portion 2511 to improve the comfort of the user's operation. In some embodiments, the operating portion 2512 may be arranged at one end of the sleeve portion 2511, or be arranged approximately in the middle of the side wall of the sleeve portion 2511. In this embodiment, the operating portion 2512 is arranged at the end of the sleeve portion 2511, which is away from the joint-component 12. In other embodiments, the operating portion 2512 may also be a groove that is recessed inwards relative to the outer surface of the sleeve portion 2511. The groove is in a curved transition with the sleeve portion 2511. In other embodiments, the operating member 251 may be a pull ring, an operating rod, a protrusion protruding from the outer surface of the hollow rod, or any other suitable structure available for operation. In this case, the operating member 251 is only slidably connected to the rod 11, rather than surrounding and fitting over the outer periphery of the rod 11.

In this embodiment, as shown in FIGS. 16 and 17, for the convenience of assembly and disassembly, the second connecting member 252 and the operating member 251 are two relatively independent parts. One end of the second connecting member 252 is detachably connected to the operating member 251, and the other end of the second connecting member 252 is inserted in the first rod-portion 111 and is connected to the fixing member 22. In some embodiment, the second connecting member 252 is a pin, a screw, or the like. In this embodiment, the second connecting member 252 is a pin.

It should be noted that, in another embodiment, the releasing component 25 may also be a single component, that is, the operating member 251 and the second connecting member 252 are integrally formed as an integral structure, which may be obtained by means of, for example, injection molding, welding, bonding, casting, or cutting. The releasing component 25 and the fixing member 22, or the releasing component 25 and the locking member 21, may also be integrally formed as an integral structure by welding, bonding, casting, or cutting. For example, the releasing component 25 may be a pin, and one end of the releasing component 25 is connected to the fixing member 22 or connected to the locking member 21 at a certain folding angle, and the angle may be about 90 degrees or any other suitable angle. In this case, the releasing component 25 and the fixing member 22, or the releasing component 25 and the locking member 21 are connected to form an integral structure, which is, for example, "7"-shaped or "T"-shaped. The integral structure may be regarded as the releasing component 25 without the operating member 251.

Referring to FIG. 12, FIG. 13, FIG. 16 and FIG. 17, in some embodiments, the stopping member 24 is connected to the rod 11, one end of the resetting member 23 abuts against or is connected to the stopping member 24, and the other end of the resetting member 23 is adapted to push the fixing member 22. In some embodiments, the resetting member 23 is a spring. More specifically, the resetting member 23 is a compression spring. When the locking member 21 is in the releasing position, the compression spring is in a compressed state, and the fixing member 22 is constantly pushed by the compression spring to drive the locking member 21 to move to the locking position. When the frame body 1 of the baby carrier is folded to a fully folded state, the locking member 21, under the elastic force of the pressure spring, is pushed to the locking position, thus locking the baby carrier in the fully folded state. The stopping member 24 may be a pin, a boss, a fixing seat, or any other suitable structure, as long as it can provide a suitable abutting end or a suitable connecting end for the resetting member 23. In this embodiment, the stopping member 24 is a pin, and the stopping member 24 is inserted in the hollow rod in a direction perpendicular to the axial direction of the hollow rod, so that a thrust direction of the compression spring is parallel to the longitudinal direction of the hollow rod.

Referring to FIG. 9, FIG. 11, FIG. 16, and FIG. 17, in an embodiment, the locking member 21 includes a fixed end 211 and a free end 212. The fixed end 211 of the locking member 21 is inserted in the fixing chamber 221 of the fixing member 22, and the free end 212 is configured to extend from the fixing chamber 221, and the free end 212 may selectively extend from the inner cavity 114 or retract into the inner cavity 114 along with the movement of the fixing member 22. In this embodiment, the number of the free end 212 of the locking member 21 is one. The locking member 21 is a pin. Referring to FIG. 16, when the frame body 1 is in the fully folded state, the receiving hole 1211 coincides with the locking hole 1221, and the free end 212 of the locking member 21 extends from the hollow rod, and is inserted in and engages with the receiving hole 1211 and the locking hole 1221, such that the locking member 21 is in the locking position, and that the first joint 121 cannot pivot relative to the second joint 122, thereby locking the frame body 1 in the folded state. Referring to FIG. 17, when the locking member 21 is in the releasing position, the free end 212 disengages from at least one of the receiving hole 1211 and the locking hole 1221. It should be noted that, in this embodiment, that the receiving hole 1211 coincides with the locking hole 1221 refers to a complete overlap. The shapes and sizes of the receiving hole 1211 and locking hole 1221 may be exactly the same or not, respectively, which mainly depends on a shape and a size of the free end 212 of the locking member 21, as long as when the frame body 1 is in the folded state, the free end 212 can be inserted in the receiving hole 1211 and in the locking hole 1221 as well. In this embodiment, both the receiving hole 1211 and the locking hole 1221 are through holes. In other embodiments, one of the receiving hole 1211 and the locking hole 1221 is a blind hole, which is not limited in the present invention, as long as the two holes can engage with the free end 212, and allow the free end 212 to be inserted therein.

In other embodiments, the receiving hole 1211 and the locking hole 1221 may partially overlap, and in this case, the free end 212 of the locking member 21 is inserted into a partially overlapped area, so that the locking member 21 is in the locking position, and the pivoting of the first joint 121 and second joint 122 is limited to a small range. In another embodiment, there are at least two free ends 212 of the locking member 21. When the frame body 1 is in a completely folded state, the receiving hole 1211 and the locking hole 1221 may not overlap at all. In this case, the at least two free ends 212 of the locking member 21 are inserted in and engage with the receiving hole 1211 and the locking hole 1221 respectively, so that the locking member 21 is in the locking position, and the first joint 121 cannot pivot relative to the second joint 122. In some embodiments, both the receiving hole 1211 and the locking hole 1221 are through holes, or one of the receiving hole 1211 and the locking hole 1221 is a blind hole, or both the receiving hole 1211 and the locking hole 1221 are blind holes, which is not limited in the present invention, as long as the free ends 212 can be respectively inserted in and engage with the holes 1211 and 1221 simultaneously.

In the embodiments described above in FIGS. 1 to 15, the locking member 21 is arranged in the hollow rod, and is movable along the longitudinal direction parallel to the hollow rod. In another embodiment, the locking member 21 of the locking mechanism 2 may also be a sleeve, and the sleeve slidably fits over and surrounds the rod 11. The free end 212 of the sleeve is configured to extend from one end of the rod 11, which is connected to the joint-component 12, and to engage with the joint-component 12. In this embodiment, the locking mechanism 2 may not include the releasing component 25, and the switching between the locking position and the releasing position may be realized by directly operating the sleeve. In this embodiment, the locking mechanism 2 may also include the stopping member 24 and the resetting member 23, and the resetting member 23 and the stopping member 24 are also arranged on the outer side of the rod 11 accordingly. Where, the resetting member 23 is a compression spring surrounds and fits over the rod 11. For other structural descriptions of this embodiment, reference may be made to relevant descriptions of the foregoing embodiments, which will not be repeated hereinafter.

The working principle of the baby carrier of the present invention is as follows.

When the frame body 1 of the baby carrier is in the completely folded state, the receiving hole 1211 and the locking hole 1221 in the joint-component 12 coincide with each other. Under the action of the elastic force of the resetting member 23, the locking member 21 moves to the locking position, so that the free end 212 thereof is inserted in the receiving hole 1211 and the locking hole 1221 as well. The first joint 121 cannot pivot relative to the second joint 122, so that the frame body 1 is restricted in the folded state.

When the frame body 1 needs to be unfolded from the folded state, the locking member 21 is driven to move from the locking position to the releasing position by operating the releasing component 25 arranged on the rod 11, so as to release the restriction performed by the locking member 21 on the pivoting of the joint-component 12. In this case, the frame body 1 may be folded or unfolded manually. When the frame body 1 is in a state between the semi-folded state and the unfolded state, the receiving hole 1211 and the locking hole 1221 do not overlap at all or overlap slightly, and the locking member 21 is inserted in only the receiving hole 1211 but not in the locking hole 1221. The locking member 21 is in the releasing position, and the relative pivoting between the first joint 121 and the second joint 122 is not restricted by the locking member 21. At this time, even if the user releases the releasing component 25, as long as the frame body 1 is not in the completely folded state, the locking member 21 will not restrict the relative pivoting between the first joint 121 and the second joint 122, and the frame body 1 may be unfolded or folded freely.

The above baby carrier has at least the following beneficial effects.

The locking mechanism 2 of the baby carrier has a simple structure. By arranging the locking mechanism 2 slidably on the rod 11, on one hand, the locking mechanism 2 may be operated very conveniently to lock the baby carrier; and on the other hand, after the baby carrier is folded, the overall appearance of the baby carrier will not be affected, thereby making the appearance of the baby carrier more concise.

The technical features of the embodiments above may be arbitrarily combined. For the sake of conciseness, not all possible combinations of various technical features in the embodiments are described. However, as long as there are no contradictions between the combinations of the technical features, these combinations should be within the scope of the specification.

The embodiments above are some examples of the present disclosure, which are described in detail, but should not be understood as limiting the scope of the disclosure. It should be noted that various variations and modifications may be made by those skilled in the art without departing from the concepts of the present disclosure, and these variations and modifications all fall within the protection scope of the present disclosure. Accordingly, the scope of protection of the present disclosure should be subject to the appended claims.

What is claimed is:

1. A baby carrier, comprising:
   a frame body, configured to be selectively folded or unfolded and comprising a rod and a pivotable joint-component, the rod being connected to the joint-component, and a pivot of the joint-component being positioned on an axis offset from a connection between the rod and the joint-component; and
   a locking mechanism, slidably arranged on the rod, and movable between a locking position restricting pivoting of the joint-component and a releasing position allowing the pivoting of the joint-component,
   wherein
   when the frame body is in a folded state, the locking mechanism engages with the joint-component, and the pivoting of the joint-component is restricted by the locking mechanism such that the frame body is locked in the folded state; and
   when the frame body is in an unfolded state, the pivoting of the joint-component is free from being restricted by the locking mechanism.

2. The baby carrier according to claim 1, wherein the locking mechanism comprises:
   a locking member, engaging with the joint-component to restrict the pivoting of the joint-component when the locking mechanism is in the locking position; and
   a resetting member, configured to constantly drive the locking member to move to the locking position.

3. The baby carrier according to claim 2, wherein:
   the locking mechanism further comprises a stopping member, and the stopping member is connected to the rod; and
   one end of the resetting member abuts against or is connected to the stopping member, and another end of the resetting member is adapted to push the locking member.

4. The baby carrier according to claim 1, wherein the locking mechanism further comprises a releasing component, and the releasing component is adapted to operatively switch the locking mechanism from the locking position to the releasing position.

5. The baby carrier according to claim 2, wherein:
   at least a portion of the rod, where the locking member is arranged, is hollow, and the locking member is arranged in the hollow portion of the rod, and is movable in a direction parallel to an axial direction of the rod;
   the locking mechanism further comprises a releasing component; the releasing component is connected to the locking member, and the releasing component comprises an operating member and a second connecting member; and the operating member is arranged on an outer side of the rod; one end of the second connecting member is connected to the operating member, and another end of the second connecting member is inserted in the rod and connected to the locking member.

6. The baby carrier according to claim 5, wherein the rod is provided with a limiting elongated-groove forming a travel range of a sliding of the locking member, and the second connecting member is inserted in the limiting elongated-groove to connect the operating member and the locking member.

7. The baby carrier according to claim 5, wherein the operating member is an operating sleeve fitting over the outer side of the rod.

8. The baby carrier according to claim 5, wherein the locking mechanism further comprises a fixing member; the fixing member is arranged inside the rod and is movable along a direction parallel to a longitudinal direction of the rod; and the locking member is connected to the releasing component through the fixing member.

9. The baby carrier according to claim 8, wherein the fixing member is a fixing sleeve; the fixing member has a fixing chamber extending along a direction parallel to the longitudinal direction of the rod; and the locking member is inserted in the fixing chamber.

10. The baby carrier according to claim 8, wherein the locking mechanism further comprises a first connecting member, and the locking member is connected to the fixing member through the first connecting member.

11. The baby carrier according to claim 2, wherein:

the joint-component comprises a first joint and a second joint; the first joint and the second joint are pivotally connected by the pivot; the first joint has a receiving hole, and the second joint has a locking hole; and the locking member comprises a free end; the free end is inserted in and engages with the receiving hole and the locking hole when the locking member is in the locking position; and the free end disengages from at least one of the receiving hole and the locking hole when the locking member is in the releasing position.

12. The baby carrier according to claim 11, wherein when the frame body is in the folded state, the receiving hole and the locking hole overlap, and the free end is configured to be inserted in an overlapped area of the receiving hole and the locking hole.

13. The baby carrier according to claim 11, wherein both the receiving hole and the locking hole are positioned on an axis offset from the pivot of the joint-component.

14. The baby carrier according to claim 2, wherein the locking member is a pin.

15. The baby carrier according claim 1, wherein there are two joint-components arranged oppositely at two ends of the rod, and the rod is connected between the two joint-components.

16. The baby carrier according to claim 15, wherein pivots of the two joint-components are located on the same straight line.

17. The baby carrier according to claim 11, wherein the first joint is connected to a hand-gripping component of the frame body, and the second joint is connected to a rear leg support rod of the frame body; and the first joint is provided with a boss, and a guide groove is formed on the second joint to guide the boss to slide therealong.

18. The baby carrier according to claim 11, wherein the first joint is formed by fastening two first half-joints, and the second joint is clamped between the two first half-joints and is pivotable relative to the first joint.

19. The baby carrier according to claim 11, wherein the joint-component further comprises a first housing covering the first joint and a second housing covering the second joint.

20. The baby carrier according to claim 15, wherein the rod comprises a first rod-portion connected to a first joint-component, a second rod-portion connected to a second joint-component, and a third rod-portion connected between the first rod-portion and the second rod-portion;

an axis of the first rod-portion and an axis of the second rod-portion coincide with each other and are parallel to the pivot of the joint-component; and the third rod-portion is an upwardly convex curved rod.

* * * * *